US006122610A

United States Patent [19]
Isabelle

[11] Patent Number: 6,122,610

[45] Date of Patent: Sep. 19, 2000

[54] NOISE SUPPRESSION FOR LOW BITRATE SPEECH CODER

[75] Inventor: Steven H. Isabelle, San Diego, Calif.

[73] Assignee: Verance Corporation, San Diego, Calif.

[21] Appl. No.: 09/159,358

[22] Filed: Sep. 23, 1998

[51] Int. Cl.[7] .......... G10L 11/00; H04B 15/00

[52] U.S. Cl. .......... 704/226; 704/205; 704/219; 704/220; 381/94.2

[58] Field of Search .......... 704/211, 226, 704/233, 207, 219, 220, 222, 205; 381/94, 94.2

[56] References Cited

U.S. PATENT DOCUMENTS

| | | | |
|---|---|---|---|
| 4,628,529 | 12/1986 | Borth et al. | 381/94 |
| 4,630,304 | 12/1986 | Borth et al. | 381/94.3 |
| 4,630,305 | 12/1986 | Borth et al. | 381/94 |
| 4,658,426 | 4/1987 | Chabries et al. | 381/94 |
| 4,811,404 | 3/1989 | Vilmur et al. | 381/94 |
| 5,406,635 | 4/1995 | Jarvinen | 381/94 |
| 5,432,859 | 7/1995 | Yang et al. | 381/94 |
| 5,450,522 | 9/1995 | Hermansky et al. | 704/211 |
| 5,537,647 | 7/1996 | Hermansky et al. | 704/211 |
| 5,544,250 | 8/1996 | Urbanski | 381/94 |
| 5,550,924 | 8/1996 | Helf et al. | 381/94 |
| 5,577,161 | 11/1996 | Ferrigno | 704/226 |
| 5,659,622 | 8/1997 | Ashley | 381/94 |
| 5,668,927 | 9/1997 | Chan et al. | 704/240 |
| 5,680,393 | 10/1997 | Bourmeyster et al. | 370/286 |
| 5,781,883 | 7/1998 | Wynn | 704/226 |
| 5,943,429 | 8/1999 | Handel | 381/94.2 |

*Primary Examiner*—David R. Hudspeth
*Assistant Examiner*—Susan Wieland
*Attorney, Agent, or Firm*—Barry R. Lipsitz; Ralph F. Hoppin

[57] ABSTRACT

Noise is suppressed in an input signal that carries a combination of noise and speech. The input signal is divided into signal blocks, which are processed to provide an estimate of a short-time perceptual band spectrum of the input signal. A determination is made at various points in time as to whether the input signal is carrying noise only or a combination of noise and speech. When the input signal is carrying noise only, the corresponding estimated short-time perceptual band spectrum of the input signal is used to update an estimate of an long term perceptual band spectrum of the noise. A noise suppression frequency response is then determined based on the estimate of the long term perceptual band spectrum of the noise and the short-time perceptual band spectrum of the input signal, and used to shape a current block of the input signal in accordance with the noise suppression frequency response.

21 Claims, 10 Drawing Sheets

NOISE SUPPRESSION FOR LOW BITRATE SPEECH CODER

BACKGROUND OF THE INVENTION

The present invention provides a noise suppression technique suitable for use as a front end to a low-bitrate speech coder. The inventive technique is particularly suitable for use in cellular telephony applications.

The following prior art documents provide technological background for the present invention:

"ENHANCED VARIABLE RATE CODEC, SPEECH SERVICE OPTION 3 FOR WIDEBAND SPREAD SPECTRUM DIGITAL SYSTEMS," TIA/EIA/IS-127 Standard.

"THE STUDY OF SPEECH/PAUSE DETECTORS FOR SPEECH ENHANCEMENT METHODS," P. Sovka and P. Pollak, *Eurospeech* 95 Madrid, 1995, p. 1575–1578.

"SPEECH ENHANCEMENT USING A MINIMUM MEAN-SQUARE ERROR SHORT-TIME SPECTRAL AMPLITUDE ESTIMATOR," Y. Ephraim, D. Malah, *IEEE Transactions on Acoustics Speech and Signal Processing,* Vol. ASSP-32, No. 6, December 1984, pp. 1109–1121.

"SUPPRESSION OF ACOUSTIC NOISE USING SPECTRAL SUBTRACTION," S. Boll, *IEEE Transactions on Acoustics Speech and Signal Processing,* Vol. ASSP-27, No. 2, April, 1979, pp. 113–120.

"STATISTICAL-MODEL-BASED SPEECH ENHANCEMENT SYSTEMS," *Proceedings of the IEEE,* Vol. 80, No. 10, October 1992, pp. 1526–1544.

A low complexity approach to noise suppression is spectral modification (also known as spectral subtraction). Noise suppression algorithms using spectral modification first divide the noisy speech signal into several frequency bands. A gain, typically based on an estimated signal-to-noise ratio in that band, is computed for each band. These gains are applied and a signal is reconstructed. This type of scheme must estimate signal and noise characteristics from the observed noisy speech signal. Several implementations of spectral modification techniques can-be found in U.S. Pat. Nos. 5,687,285; 5,680,393; 5,668,927; 5,659,622; 5,651,071; 5,630,015; 5,625,684; 5,621,850; 5,617,505; 5,617,472; 5,602,962; 5,577,161; 5,555,287; 5,550,924; 5,544,250; 5,539,859; 5,533,133; 5,530,768; 5,479,560; 5,432,859; 5,406,635; 5,402,496; 5,388,182; 5,388,160; 5,353,376; 5,319,736; 5,278,780; 5,251,263; 5,168,526; 5,133,013; 5,081,681; 5,040,156; 5,012,519; 4,908,855; 4,897,878; 4,811,404; 4,747,143; 4,737,976; 4,630,305; 4,630,304; 4,628,529; and 4,468,804.

Spectral modification has several desirable properties. First, it can be made to be adaptive and hence can handle a changing noise environment. Second, much of the computation can be performed in the discrete Fourier transform (DFT) domain. Thus, fast algorithms (like the fast Fourier transform (FFT)) can be used.

There are, however, several shortcomings in the current state of the art. These include:

(i) objectionable distortion of the desired speech signal in moderate to high noise levels (such distortions have several causes, some of which are detailed below); and (ii) excessive computational complexity.

It would be advantageous to provide a noise suppression technique that overcomes the disadvantages of the prior art. In particular, it would be advantageous to provide a noise suppression technique that accounts for time-domain discontinuities typical in block based noise suppression techniques. It would be further advantageous to provide such a technique that reduces distortion due to frequency-domain discontinuities inherent in spectral subtraction. It would be still further advantageous to reduce the complexity of spectral shaping operations in providing noise suppression, and to increase the reliability of estimated noise statistics in a noise suppression technique.

The present invention provides a noise suppression technique having these and other advantages.

SUMMARY OF THE INVENTION

In accordance with the present invention, a noise suppression technique is provided in which a reduction is achieved in distortion due to time-domain discontinuities that are typical in block based noise suppression techniques. Distortion due to frequency-domain discontinuities inherent in spectral subtraction is also reduced, as is the complexity of the spectral shaping operations used in the noise suppression process. The invention also increases the reliability of estimated noise statistics by using an improved voice activity detector.

A method in accordance with the invention suppresses noise in an input signal that carries a combination of noise and speech. The input signal is divided into signal blocks, which are processed to provide an estimate of a short-time perceptual band spectrum of the input signal. A determination is made at various points in time as to whether the input signal is carrying noise only or a combination of noise and speech. When the input signal is carrying noise only, the corresponding estimated short-time perceptual band spectrum of the input signal is used to update an estimate of an long term perceptual band spectrum of the noise. A noise suppression frequency response is then determined based on the estimate of the long term perceptual band spectrum of the noise and the short-time perceptual band spectrum of the input signal, and used to shape a current block of the input signal in accordance with the noise suppression frequency response.

The method can comprise the further step of pre-filtering the input signal to emphasize high frequency components thereof. In an illustrated embodiment, the processing of the input signal comprises the application of a discrete Fourier transform to the signal blocks to provide a complex-valued frequency domain representation of each block. The frequency domain representations of the signal blocks are converted to magnitude only signals, which are averaged across disjoint frequency bands to provide a long term perceptual-band spectrum estimate. Time variations in the perceptual band spectrum are smoothed to provide the short-time perceptual band spectrum estimate.

The noise suppression frequency response can be modeled using an all-pole filter for use in shaping the current block of the input signal.

Apparatus is provided for suppressing noise in an input signal that carries a combination of noise and speech. A signal preprocessor, which can pre-filter the input signal to emphasize high frequency components thereof, divides the input signal into blocks. A fast Fourier transform processor then processes the blocks to provide a complex-valued frequency domain spectrum of the input signal. An accumulator is provided to accumulate the complex-valued frequency domain spectrum into a long term perceptual-band spectrum comprising frequency bands of unequal width. The long term perceptual-band spectrum is filtered to generate an estimate of a short-time perceptual-band spectrum comprising a current segment of said long term perceptual-band spectrum plus noise. A speech/pause detector determines whether the input signal is, at a given point in time, noise only or a combination of speech and noise. A noise spectrum estimator, responsive to the speech/pause detection circuit when the input signal is noise only, updates an estimate of the long term perceptual band spectrum of the noise based on the short-time perceptual band spectrum. A spectral gain processor responsive to the noise spectrum estimator determines a noise suppression frequency response. A spectral shaping processor responsive to the spectral gain processor then shapes a current block of the input signal to suppress noise therein. The spectral shaping processor can comprise, for example, an all-pole filter.

Also disclosed is a method for suppressing noise in an input signal that carries a combination of noise and audio information, such as speech. A noise suppression frequency response is computed for the input signal in the frequency domain. The computed noise suppression frequency response is then applied to the input signal in the time domain to suppress noise in the input signal. This method can comprise the further step of dividing the input signal into blocks prior to computing the noise suppression frequency response thereof. In an illustrated embodiment, the noise suppression frequency response is applied to the input signal via an all-pole filter generated by determining an autocorrelation function of the noise suppression frequency response.

DETAILED DESCRIPTION OF THE INVENTION

Figure 1:
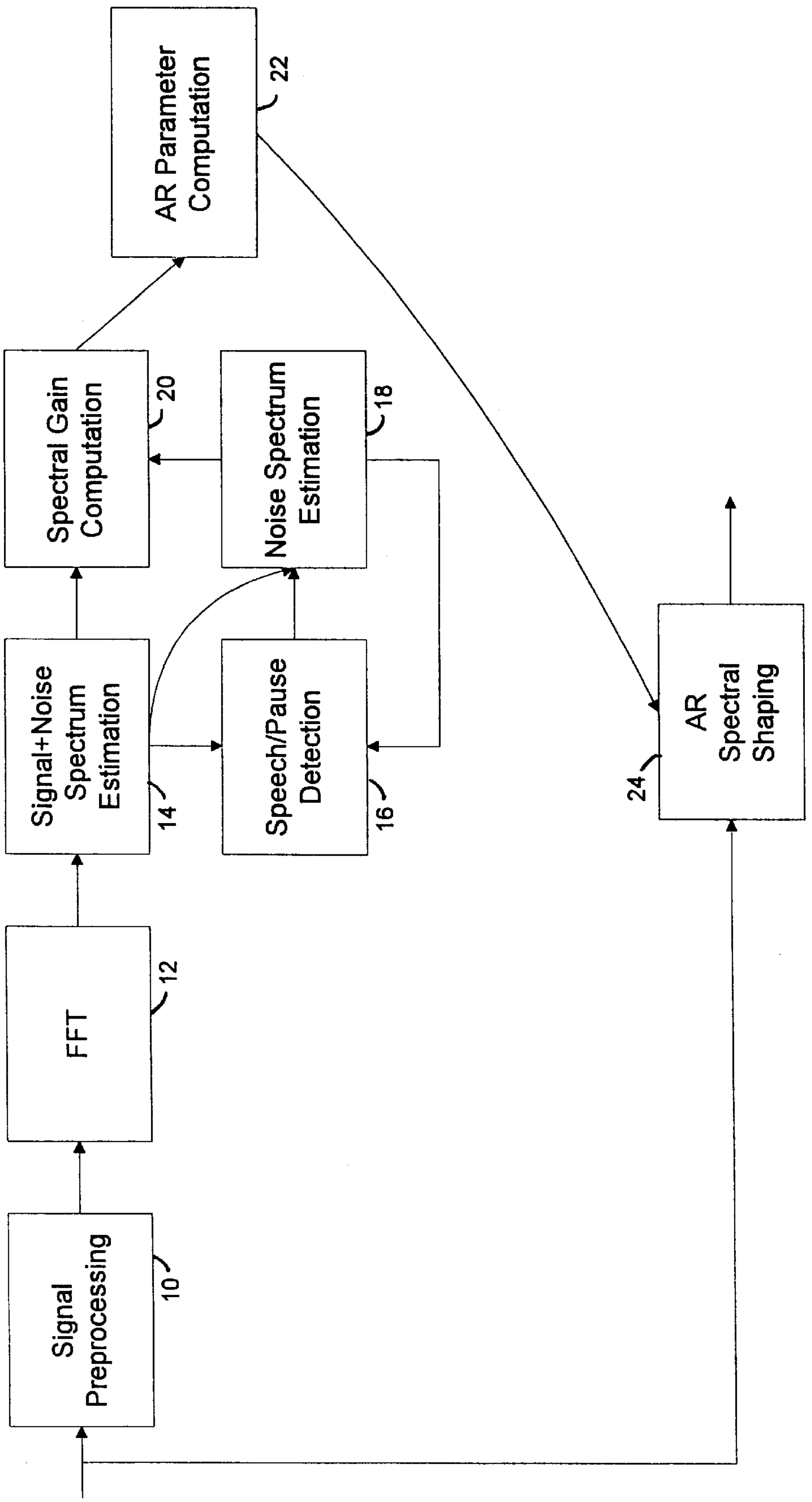
FIG. 1 is a block diagram of a noise suppression algorithm in accordance with the present invention.

In accordance with the present invention, a noise suppression algorithm computes a time varying filter response and applies it to the noisy speech. A block diagram of the algorithm is shown in FIG. 1, wherein the blocks labeled "AR Parameter Computation" and "AR Spectral Shaping" are related to the application of the time varying filter response, and "AR" designates "autoregressive." All other blocks in FIG. 1 correspond to computing the time-varying filter response from the noisy speech.

A noisy input signal is preprocessed in a signal preprocessor 10 using a simple high-pass filter to slightly emphasize its high frequencies. The preprocessor then divides the filtered signal into blocks that are passed to a fast Fourier transform (FFT) module 12. The FFT module 12 applies a window to the signal blocks and a discrete Fourier transform to the signal. The resulting complex-valued frequency domain representation is processed to generate a magnitude only signal. These magnitude-only signal values are averaged in disjoint frequency bands yielding a "perceptual-band spectrum". The averaging results in a reduction of the amount of data that must be processed.

Time-variations in the perceptual-band spectrum are smoothed in a signal and noise spectrum estimation module 14 to generate an estimate of the short-time perceptual-band spectrum of the input signal. This estimate is passed on to a speech/pause detector 16, a noise spectrum estimator 18, and a spectral gain computation module 20.

The speech/pause detector 16 determines whether the current input signal is simply noise, or a combination of speech and noise. It makes this determination by measuring several properties of the input speech signal, using these measurements to update a model of the input signal; and using the state of this model to make the final speech/pause decision. The decision is then passed on to the noise spectrum estimator.

When the speech/pause detector 16 determines that the input signal consists of noise only, the noise spectrum estimator 18 uses the current perceptual-band spectrum to update an estimate of the perceptual-band spectrum of the noise. In addition, certain parameters of the noise spectrum estimator are updated in this module and passed back to the speech/pause detector 16. The perceptual band spectrum estimate of the noise is then passed to a spectral gain computation module 20.

Figure 9:
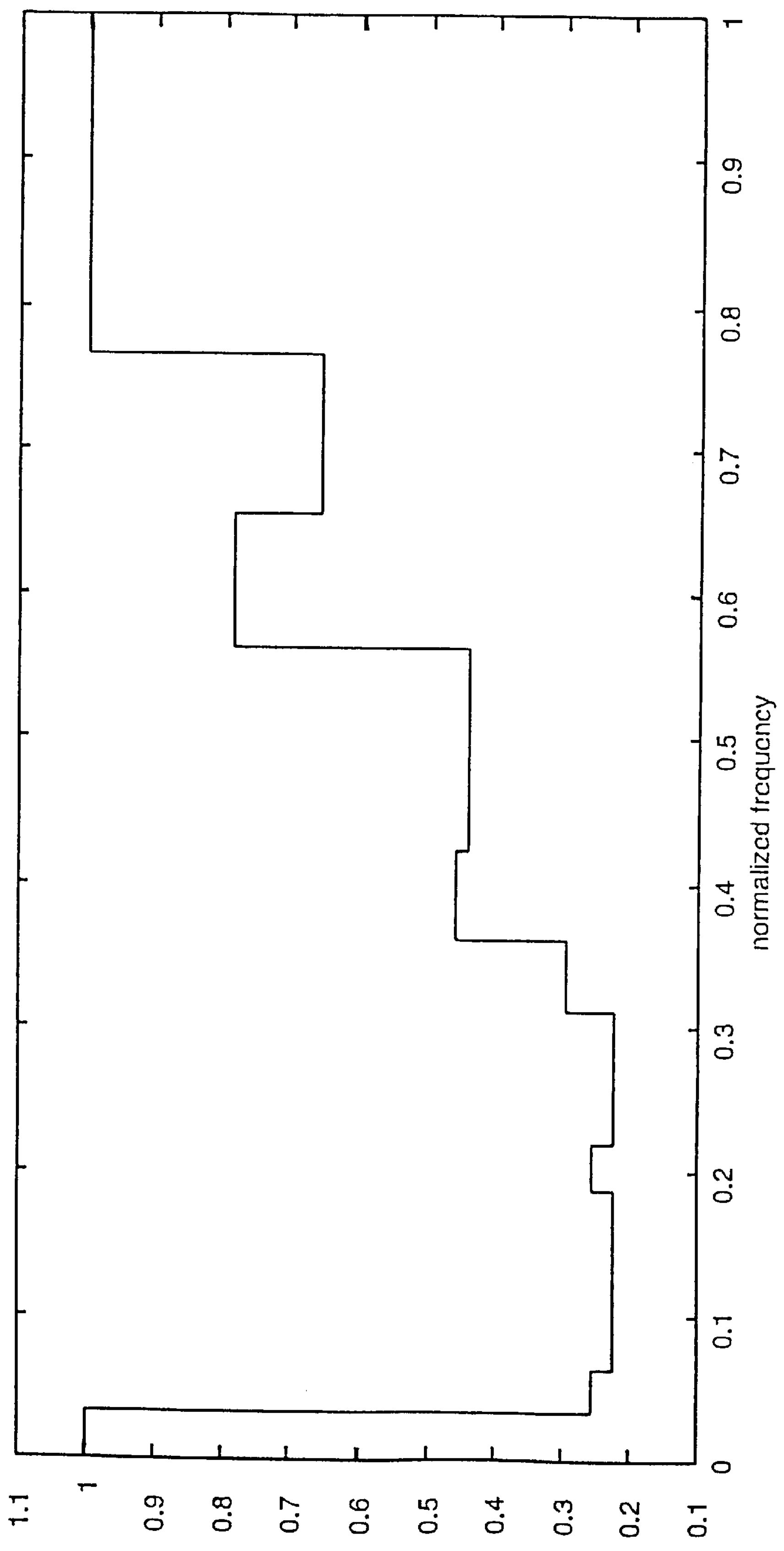
FIG. 9 illustrates a piecewise-constant frequency response.

Using the estimate of the perceptual-band spectra of the current signal and the noise, the spectral gain computation module 20 determines a noise suppression frequency response. This noise suppression frequency response is piecewise constant, as shown in FIG. 9. Each piecewise constant segment corresponds to one element of the critical band spectrum. This frequency response is passed to the AR parameter computation module 22.

The AR parameter computation module models the noise suppression frequency response with an all-pole filter. Because the noise suppression frequency response is piecewise constant, its auto-correlation function can easily be determined in closed form. The all-pole filter parameters can then be efficiently computed from the auto-correlation function. The all pole modeling of the piecewise constant spectrum has the effect of smoothing out discontinuities in the noise suppression spectrum. It should be appreciated that other modeling techniques now known or hereafter discovered may be substituted for the use of an all-pole filter and all such equivalents are intended to be covered by the invention claimed herein.

The AR spectral shaping module 24 uses the AR parameters to apply a filter to the current block of the input signal. By implementing the spectral shaping in the time domain, time discontinuities due to block processing are reduced. Also, because the noise suppression frequency response can be modeled with a low-order all-pole filter, time domain shaping may result in a more efficient implementation on certain processors.

In signal preprocessing module 10, the signal is first pre-emphasized with a high-pass filter of the form $H(z)=1-0.8z^{-1}$. This high-pass filter is chosen to partially compensate for the spectral tilt inherent in speech. Signals thus preprocessed generate more accurate noise suppression frequency responses.

Figure 2:
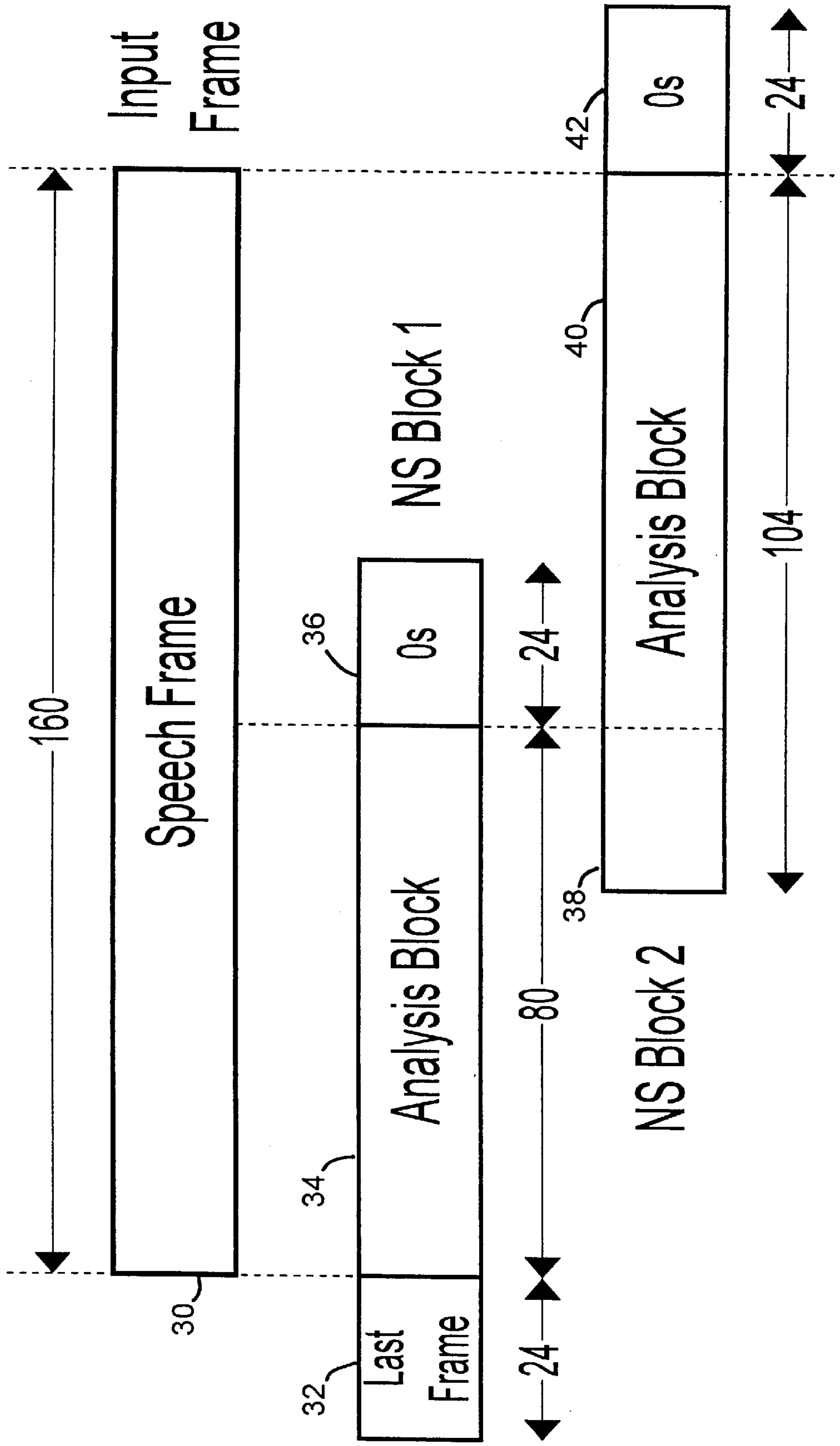
FIG. 2 is a diagram illustrating the block processing of an input signal in accordance with the invention.

As illustrated in FIG. 2, the input signal 30 is processed in blocks of eighty samples (corresponding to 10 ms at a sampling rate of 8 KHz). This is illustrated by analysis block 34, which, as shown, is eighty samples in length. More particularly, in the illustrated example embodiment, the input signal is divided into blocks of one hundred twenty-eight samples. Each block consists of the last twenty-four samples from the previous block (reference numeral 32), the eighty new samples of the analysis block 34, and twenty-four samples of zeros (reference numeral 36). Each block is windowed with a Hamming window and Fourier transformed.

The zero-padding implicit in the block structure deserves further explanation. In particular, from a signal processing standpoint, zero-padding is unnecessary because the spectral shaping (described below) is not implemented using a Discrete Fourier Transform. However, including the zero-padding eases the integration of this algorithm into the existing EVRC voice codec implemented by Solana Technology Development Corporation, the assignee of the present invention. This block structure requires no change in the overall buffer management strategy of the existing EVRC code.

Each noise suppression frame can be viewed as a 128-point sequence. Denoting this sequence by g[n], the frequency-domain representation of a signal block is defined as the discrete Fourier transform $$G[k] = c\sum_{n=0}^{M-1} g[n]e^{j2\pi nk/M},$$

where c is a normalization constant.

The signal spectrum is then accumulated into bands of unequal width as follows:

$$S[k] = \frac{1}{f_h[k] - f_l[k] + 1}\sum_{i=f_l[k]}^{f_h[k]} |G[i]|^2$$

where $f_l[k]=\{2,4,6,8,10,12,14,17,20,23,27,31,36,42,49,56\}$ $f_h[k]=\{3,5,7,9,11,13,16,19,22,26,30,35,41,48,55,63\}$.

Figure 3:
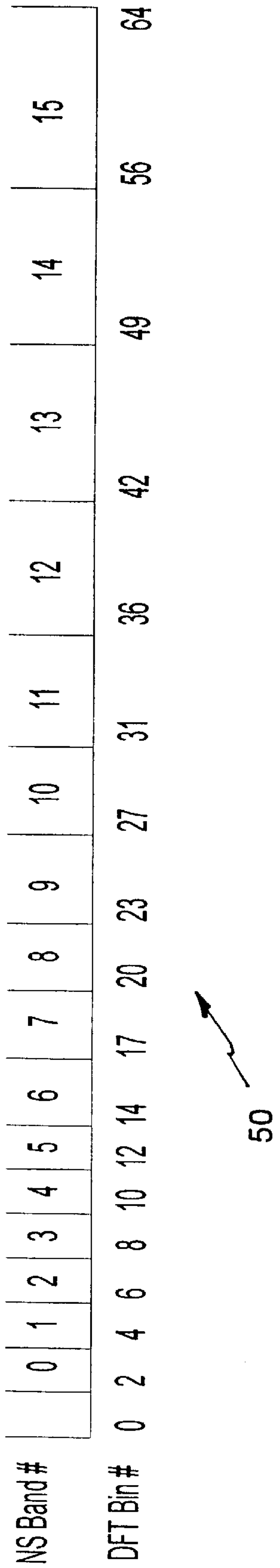
FIG. 3 is a diagram illustrating the correlation of various noise spectrum bands (NS Band), which are of different widths, with discrete Fourier transform (DFT) bins.

This is referred to as the perceptual-band spectrum. The bands, generally designated 50, are illustrated in FIG. 3. As shown, the noise spectrum bands (NS Band) are of different widths, and are correlated with discrete Fourier transform (DFT) bins.

The estimate of the perceptual band spectrum of the signal plus noise is generated in module 14 (FIG. 1) by filtering the perceptual-band spectra, e.g., with a single-pole recursive filter. The estimate of the power spectrum of the signal plus noise is:

$$S_u[k]=\beta\cdot S_u[k]+(1-\beta)\cdot S[k].$$

Because the properties of speech are stationary only over relatively short time periods, the filter parameter β is chosen to perform smoothing over only a few (e.g., 2–3) noise suppression blocks. This smoothing is referred to as "short-time" smoothing, and provides an estimate of a "short-time perceptual band spectrum."

The noise suppression system requires an accurate estimate of the noise statistics in order to function properly. This function is provided by the speech/pause detection module 16. In one possible embodiment, a single microphone is provided that measures both the speech and the noise. Because the noise suppression algorithm requires an estimate of noise statistics, a method for distinguishing between noisy speech signals and noise-only signals is required. This method must essentially detect pauses in noisy speech. This task is made more difficult by several factors:

1. The pause detector must perform acceptably in low signal-to-noise ratios (on the order of 0 to 5 dB).
2. The pause detector must be insensitive to slow variations in background noise statistics.
3. The pause detector must accurately distinguish between noise-like speech sounds (e.g. fricatives) and background noise.

Figure 4:
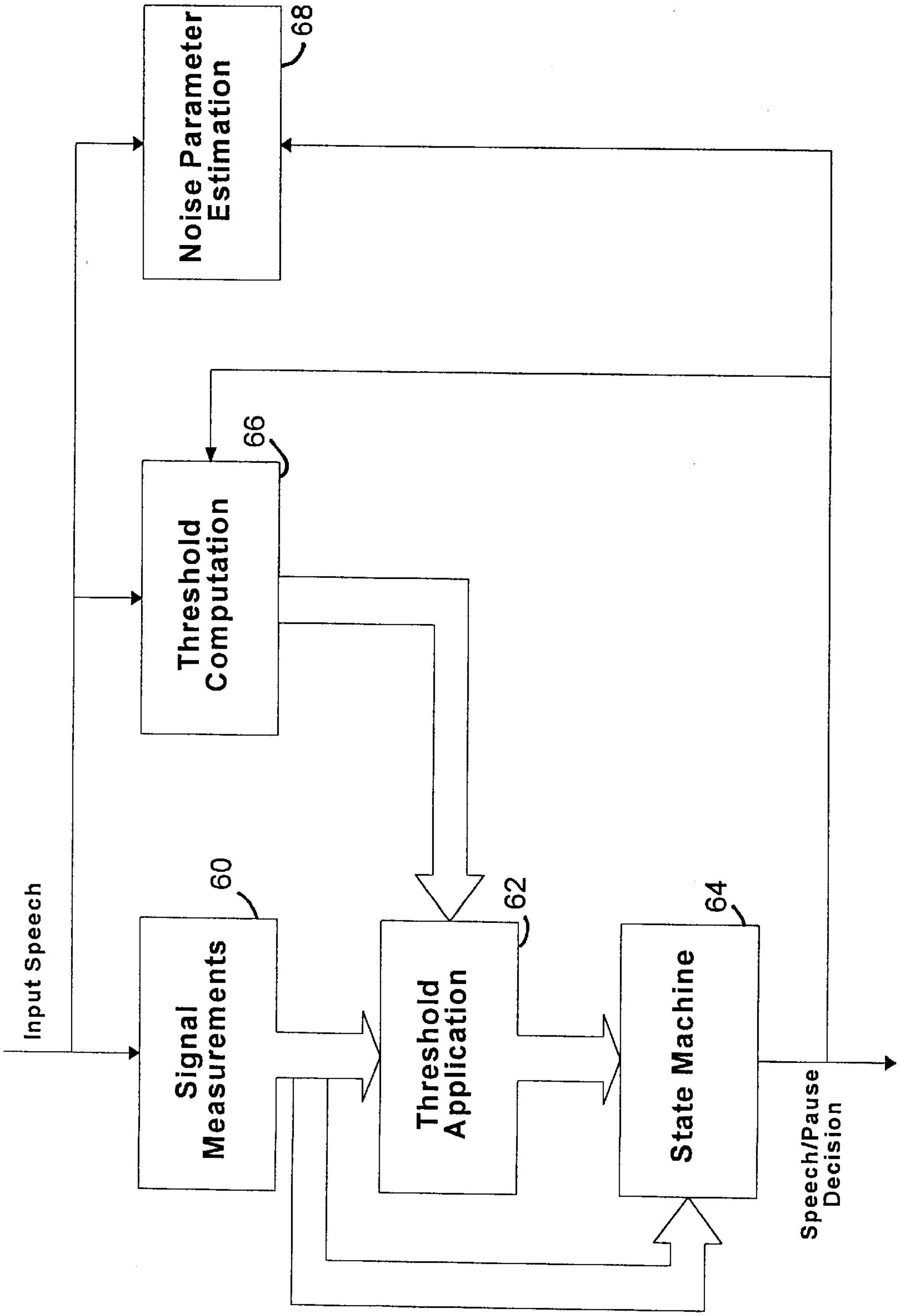
FIG. 4 is a block diagram of one possible embodiment of a speech/pause detector.

A block diagram of one possible embodiment of the speech/pause detector 16 is provided in FIG. 4.

The pause detector models the noisy speech signal as it is being generated by switching between a finite number of signal models. A finite-state machine (FSM) 64 governs transitions between the models. The speech/pause decision is a function of the current state of the FSM along with measurements made on the current signal and other appropriate state variables. Transitions between states are functions of the current FSM state and measurements made on the current signal.

The measured quantities described below are used to determine binary valued parameters that drive the signal-state state machine 64. In general these binary valued parameters are determined by comparing the appropriate real-valued measurements to an adaptive threshold. The signal measurements provided by measurement module 60 quantify the following signal properties:

1. An energy measure determines whether the signal is of high or low energy. This signal energy, denoted E[i], is defined as $$E_i = \log\sum_{k=0}^{63} |G[k]|^2.$$

Figure 5:
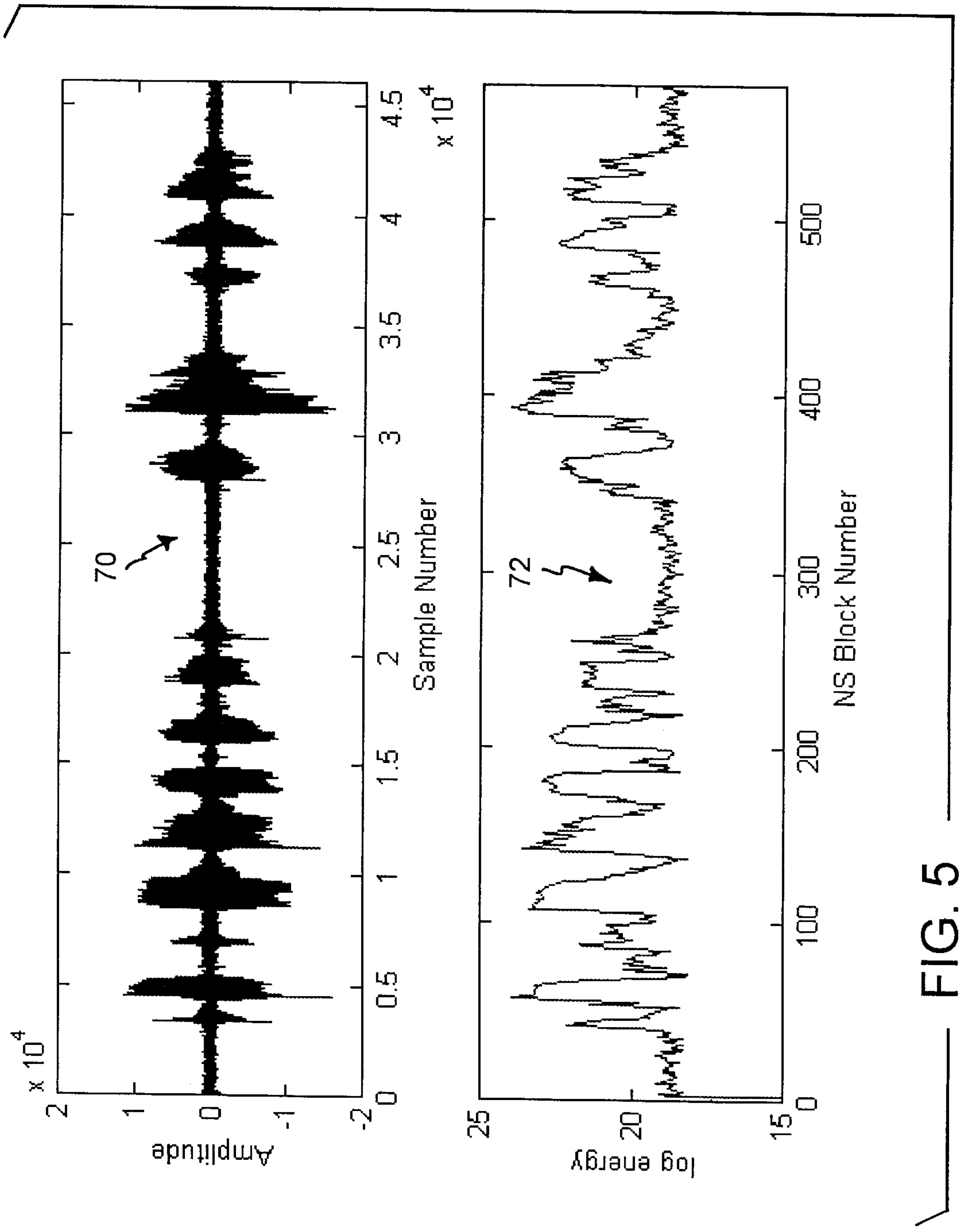
FIG. 5 comprises waveforms providing an example of the energy measure of a noisy speech utterance.

An example of the energy measure of a noisy speech utterance is shown in FIG. 5, where the amplitude of individual speech samples is indicated by curve 70 and the energy measure of the corresponding NS blocks is indicated by curve 72.

2. A spectral transition measure determines whether the signal spectrum is steady-state or transient over a short time window. This measure is computed by determining an empirical mean and variance of each band of the perceptual band spectrum. The sum of the variances of all bands of the perceptual band spectrum is used as a measure of spectral transition. More specifically, the transition measure, denoted $T_i$, is computed as follows:

The mean of each band of the perceptual spectrum is computed by the single-pole recursive filter $\bar{S}_i[k]=\alpha\bar{S}_{i-1}[k]+(1-\alpha)S_i[k]$. The variance of each band of the perceptual spectrum is computed by the recursive filter $\hat{S}_i[k]=\alpha\hat{S}_i[k]+(1-\alpha)(S_i[k]-\bar{S}_i[k])^2$. The filter parameter α is chosen to perform smoothing over a relatively long period of time, i.e. 10 to 12 noise suppression blocks.

The total variance is computed as the sum of the variance of each band $$\sigma_i^2 = \sum_{k=0}^{15} \hat{S}_i[k].$$

Note that the variance of $\sigma_i^2$ itself will be smallest when the perceptual band spectrum does not vary greatly from its long term mean. It follows that a reasonable measure of spectral transition is the variance of $\sigma_i^2$, which is computed as follows:

$$\bar{\sigma}^2_i=\omega_i\bar{\sigma}^2_{i-1}+(1-\omega_i)\sigma_i^2$$

$$T_i=\omega_i T_{i-1}+(1-\omega_i)(\sigma_i^2-\bar{\sigma}^2_i)^2$$

The adaptive time constant $\omega_i$ is given by:

$$\omega_i = \begin{cases} 0.875 & \sigma_i^2 > \bar{\sigma}_{i-1}^2 \\ 0.25 & \sigma_i^2 \le \bar{\sigma}_{i-1}^2 \end{cases}.$$

Figure 6:
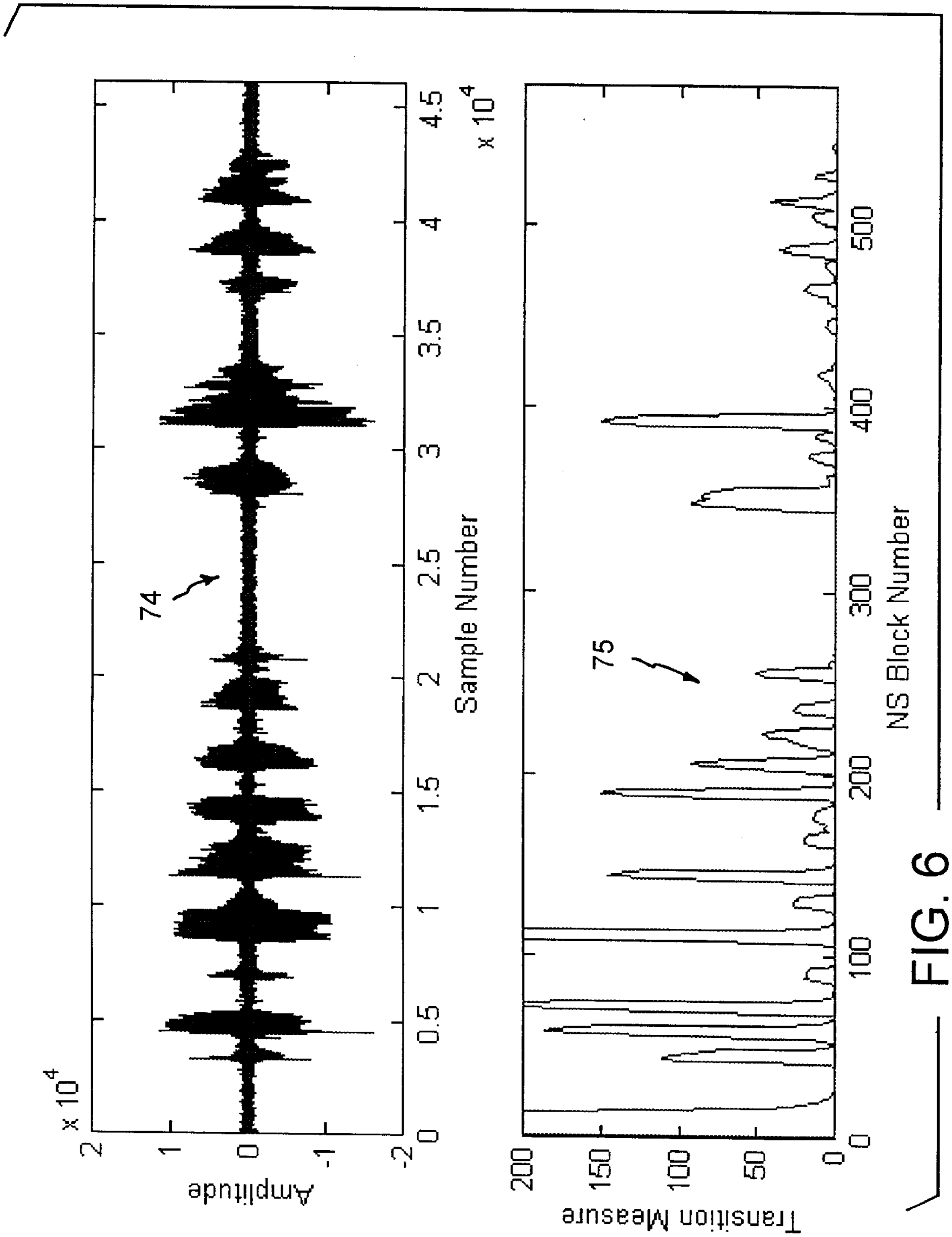
FIG. 6 comprises waveforms providing an example of the spectral transition measure of a noisy speech utterance.

By adapting the time constant, the spectral transition measure properly tracks portions of the signal that are stationary. An example of the spectral transition measure of a noisy speech utterance is shown in FIG. 6, where the amplitude of individual speech samples is indicated by curve 74 and the energy measure of the corresponding NS blocks is indicated by curve 75.

3. A spectral similarity measure, denoted $SS_i$, measures the degree to which the current signal spectrum is similar to the estimated noise spectrum. In order to define the spectral similarity measure, we assume that an estimate of the logarithm of the perceptual band spectrum of the noise, denoted by $N_i[k]$, is available (the definition of $N_i[k]$ is provided below in connection with the discussion on the noise spectrum estimator). The spectral similarity measure is then defined as $$SS_i = \sum_{k=0}^{15} |\log S_i[k] - N_i[k]|.$$

Figure 7:
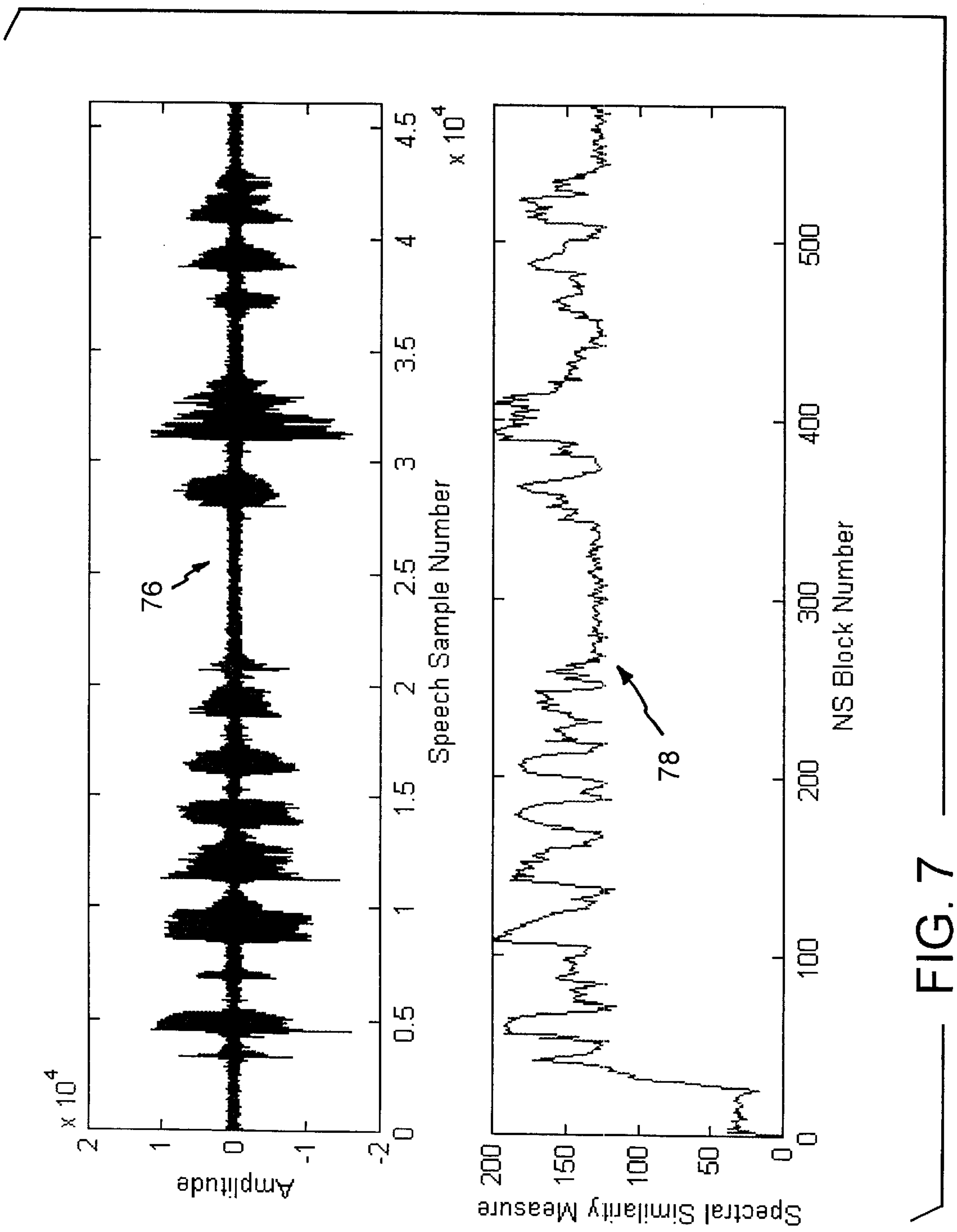
FIG. 7 comprises waveforms providing an example of the spectral similarity measure of a noisy speech utterance.

An example of the spectral similarity measure of a noisy utterance is shown in FIG. 7, where the amplitude of individual speech samples is indicated by curve 76 and the energy measure of the corresponding NS blocks is indicated by curve 78. Note that the a low value of the spectral similarity measure corresponds to highly similar spectra, while a higher spectral similarity measure corresponds to dissimilar spectra.

4. An energy similarity measure determines whether the current signal energy $$E_i = \log\sum_{k=0}^{63} |G[k]|^2$$

is similar to the estimated noise energy. This is determined by comparing the signal energy to a threshold applied by threshold application module 62.

The actual threshold is computed by a threshold computation processor 66, which can comprise a microprocessor.

The binary parameters are defined by denoting the current estimate of the signal spectrum by S[k], the current estimate of the signal energy by $E_i$, the current estimate of the log noise spectrum by $N_i[k]$, the current estimate of the noise energy by $\bar{N}_i$, and the variance of the noise energy estimate by $\hat{N}_i$.

The parameter high_low_energy indicates whether the signal has a high energy content. High energy is defined relative to the estimated energy of the background noise. It is computed by estimating the energy in the current signal frame and applying a threshold. It is defined as $$\text{high\_low\_energy} = \begin{cases} 1 & E_i > E_t \\ 0 & E_i \le E_t \end{cases}$$

Where E is defined by $$E_i = \log\sum_{k=0}^{63} |G[k]|^2$$

and $E_t$ is an adaptive threshold.

The parameter transition indicates when the signal spectrum is going through a transition. It is measured by observing the deviation of the current short-time spectrum from the average value of the spectrum. Mathematically it is defined by $$\text{transition} = \begin{cases} 1 & T_i > T_t \\ 0 & T_i \le T_t \end{cases}$$

where T is the spectral transition measure defined in the previous section and $T_t$ is an adaptively computed threshold described in greater detail hereinafter.

The parameter spectral_similarity measures similarity between the spectrum of the current signal and the estimated noise spectrum. It is measured by computing the distance between the log spectrum of the current signal and the estimated log spectrum of the noise.

$$\text{spectral\_similarity} = \begin{cases} 1 & SS_i < SS_t \\ 0 & SS_i \ge SS_t \end{cases}$$

where $SS_i$ is described above and $SS_t$ is a threshold (e.g., a constant) as discussed below.

The parameter energy similarity measures the similarity between the energy in the current signal and the estimated noise energy.

$$\text{energy\_similarity} = \begin{cases} 1 & E < ES_t \\ 0 & E \ge ES_t \end{cases}$$

where E is defined by $$E_i = \log\sum_{k=0}^{63} |G[k]|^2$$

and $ES_t$ is an adaptively computed threshold defined below.

The variables described above are all computed by comparing a number to a threshold. The first three thresholds reflect the properties of a dynamic signal and will depend on the properties of the noise. These three thresholds are the sum of an estimated mean and sum multiple of the standard deviation. The threshold for the spectral similarity measure does not depend on the specific properties of the noise and can be set to a constant value.

The high/low energy threshold is computed by threshold computation processor 66 (FIG. 4) as $E_t=\bar{E}_{i-1}+2\sqrt{\hat{E}_{i-1}}$, where $\hat{E}_i$ is the empirical variance defined as $\hat{E}_i=\gamma_i\hat{E}_{i-1}+(1-\gamma_i)(E_i-\bar{E}_{i-1})^2$, and $\overline{E}_i$ is the empirical mean defined as $E_i=\gamma\overline{E}_{i-1}+(1-\gamma)E_i$.

The energy similarity threshold is computed as $$ES_t[i]=\begin{cases}\overline{N}_i+2\sqrt{\hat{N}_i} & \overline{N}_i+2\sqrt{\hat{N}_i}<1.05ES_t[i-1]\\ 1.05ES_t[i-1] & \text{otherwise.}\end{cases}$$

Note that the growth rate of the energy similarity threshold is limited by the factor 1.05 in the present example. This ensures that high noise energies do not have a disproportionate influence on the value of the threshold.

The spectral transition threshold is computed as $T_t=2\hat{N}_i$. The spectral similarity threshold is constant with value $SS_t=10$.

Figure 8:
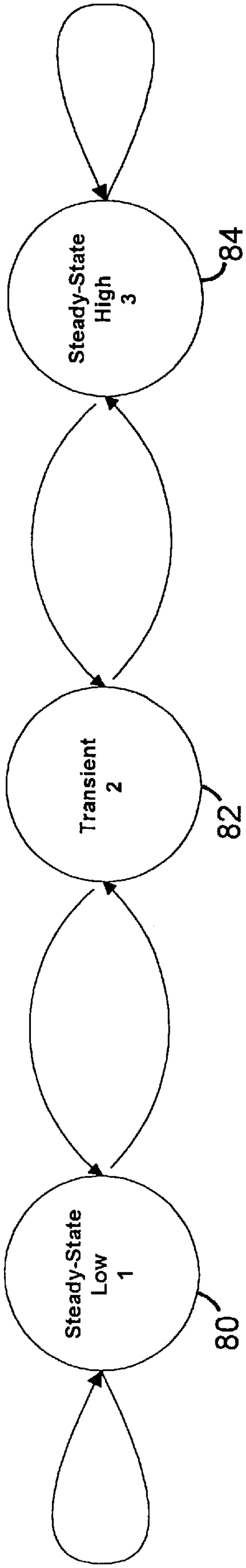
FIG. 8 is an illustration of a signal-state machine that models a noisy speech signal.

The signal-state state machine 64 that models the noisy speech signal is illustrated in greater detail in FIG. 8. Its state transitions are governed by the signal measurements described in the previous section. The signal states are steady-state low energy, shown as element 80, transient, shown as element 82, and steady-state high energy, shown as element 84. During steady-state, low energy, no spectral transition is occurring and the signal energy is below a threshold. During transient, a spectral transition is occurring. During steady-state high energy, no spectral transition is occurring and the signal energy is above a threshold. The transitions between states are governed by the signal measurements described above.

The state machine transitions are defined in Table 1.

TABLE 1

| Transition | Inputs | |
|---|---|---|
| Initial -> Final | Transition | High/Low Energy |
| 1 -> 1 | 0 | 0 |
| 1 -> 2 | 1 | X |
| 1 -> 2 | 0 | 1 |
| 2 -> 1 | 0 | 0 |
| 2 -> 2 | 1 | X |
| 2 -> 3 | 0 | 1 |
| 3 -> 2 | 1 | X |
| 3 -> 2 | 0 | 0 |
| 3 -> 3 | 0 | 1 |

In this table, "X" means "any value". Note that a state transition is assured for any measurement.

The speech/pause decision provided by detector 16 (FIG. 1) depends on the current state of the signal-state state machine and by the signal measurements described in connection with FIG. 4. The speech/pause decision is governed by the following pseudocode (pause: dec=0; speech: dec=1):

```
dec = 1;
if spectral_similarity == 1
    dec = 0;
elseif current_state == 1
    if energy_similarity == 1
        dec = 0;
    end
end
```

The noise spectrum is estimated by noise parameter estimation module 68 (FIG. 4) during frames classified as pauses using the formula $N_i[k]=\beta N_i[k]+(1-\beta)\log(S_i[k])$, where $\beta$ is a constant between 0 and 1. The current estimate of the noise energy, $\overline{N}_i$, and the variance of the noise energy estimate, $\hat{N}_i$, are defined as follows:

$$\overline{N}_i=\lambda\bar{N}_{i-1}[k]+(1-\lambda)\log(E_i),$$

$$\hat{N}_i=\lambda\hat{N}_{i-1}[k]+(1-\lambda)(\overline{N}_i-\log(E_2))^2,$$

where the filter constant $\lambda$ is chosen to average 10–20 noise suppression blocks.

The spectral gains can be computed by a variety of methods well known in the art. One method that is well-suited to the current implementation comprises defining the signal to noise ratio as $SNR[k]=c*(\log(S_u[k])-N_i[k])$, where c is a constant and $S_u[k]$ and $N_i[k]$ are as defined above. The noise dependent component of the gain is defined as $$\gamma_N=-10*\sum_k N[k].$$

The instantaneous gain is computed as $G_{ch}[k]=10^{(\gamma_N+c_2(SNR[k]-6))/20}$. Once the instantaneous gain has been computed, it is smoothed using the single-pole smoothing filter $G_S[k]=\beta G_S[k-1]+(1=\beta)G_{ch}[k]$, where the vector $G_S[k]$ is the smoothed channel gain vector at time k.

Once a target frequency response has been computed, it must be applied to the noisy speech. This corresponds to a (time-varying) filtering operation that modifies the short-time spectrum of the noisy speech signal. The result is the noise-suppressed signal. Contrary to current practice, this spectral modification need not be applied in the frequency domain. Indeed,. a frequency domain implementation may have the following disadvantages:

1. It may be unnecessarily complex.

2. It may result in lower quality noise suppressed speech.

A time domain implementation of the spectral shaping has the added advantage that the impulse response of the shaping filter need not be linear phase. Also, a time-domain implementation eliminates the possibility of artifacts due to circular convolution.

The spectral shaping technique described herein consists of a method for designing a low complexity filter that implements the noise suppression frequency response along with the application of that filter. This filter is provided by the AR spectral shaping module 24 (FIG. 1) based on parameters provided by AR parameter computation processor 22.

Because the desired frequency response is piecewise-constant with relatively few segments, as illustrated in FIG. 9, its auto-correlation function can be efficiently determined in closed form. Given the auto-correlation coefficients, an all-pole filter that approximates the piecewise constant frequency response can be determined. This approach has several advantages. First, spectral discontinuities associated with the piecewise constant frequency response are smoothed out. Second, the time discontinuities associated with FFT block processing are eliminated. Third, because the shaping is applied in the time-domain, an inverse DFT is not required. Given the low order of the all-pole filter, this may provide a computational advantage in a fixed point implementation.

Such a frequency response can be expressed mathematically as $$H(\omega)=\sum_{i=1}^{N_c}G_s[k]I(\omega,\omega_{k-1},\omega_k),$$

where $G_S[k]$ is the smoothed channel gain, which sets the amplitude of the $i^{th}$ piecewise-constant segment, and $I(\omega, \omega_{i-1},\omega_i)$ is the indicator function for the interval bounded by the frequencies $\omega_{i-1},\omega_i$, i.e., $I(\omega,\omega_{i-1},\omega_i)$ equals 1 when $\omega_{i-1}<\omega<\omega_i$, and 0 otherwise. The auto-correlation function is the inverse Fourier transform of $H^2(\omega)$, i.e., $$R_{hh}(n)=2\sum_{i=1}^{N_c}G_s^2[k]\frac{\sin(\gamma_i n)\cos(\beta_i n)}{\pi n},$$

where $\gamma_i=(\omega_i-\omega_{i-1})$ and $\beta_i=(\omega_{i-1}+\omega_i)/2$. This can be easily implemented using a table lookup for the values of $$\frac{\sin(\gamma_i n)\cos(\beta_i n)}{\pi n}.$$

Given the auto-correlation function set forth above, an all-pole model of the spectrum can be determined by solving the normal equations. The required matrix inversion can be computed efficiently using, e.g., the Levinson/Durbin recursion.

Figure 10:
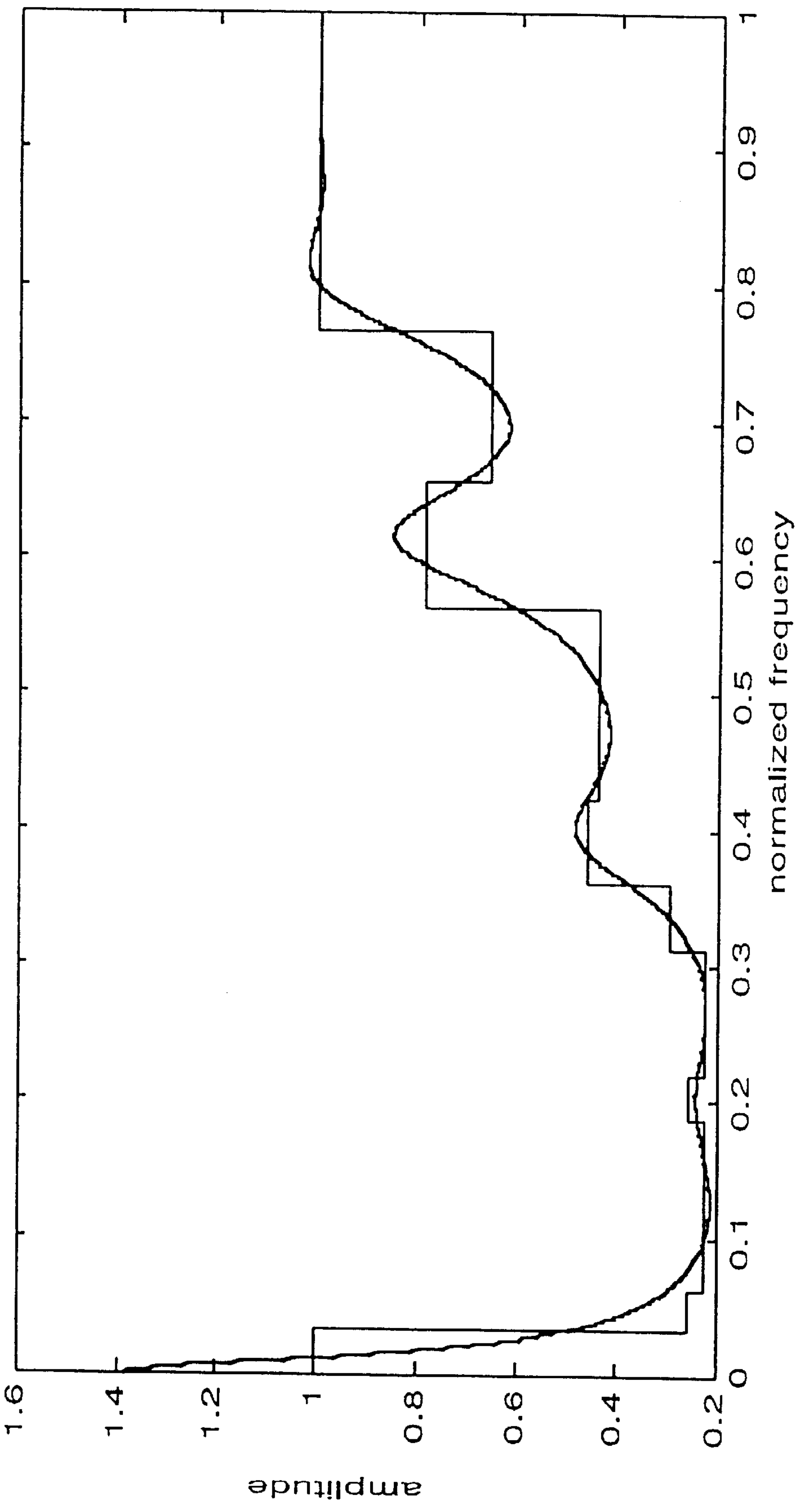
FIG. 10 illustrates the smoothing of the piecewise-constant frequency response of FIG. 9.

An example of the effectiveness of all-pole modeling with an order sixteen filter is shown in FIG. 10. Note that the spectral discontinuities have been smoothed out. Obviously, the model can be made more accurate by increasing the all-pole filter order. However, a filter order of sixteen provides good performance at reasonable computational cost.

The all-pole filter provided by the parameters computed by the AR parameter computation processor 22 is applied to the current block of the noisy input signal in the AR spectral shaping module 24, in order to provide the spectrally shaped output signal.

It should now be appreciated that the present invention provides a method and apparatus for noise suppression with various unique features. In particular, a voice activity detector is provided which consists of a state-machine model for the input signal. This state-machine is driven by a variety of measurements made from the input signal. This structure yields a low complexity yet highly accurate speech/pause decision. In addition, the noise suppression frequency response is computed in the frequency-domain but applied in the time-domain. This has the effect of eliminating time-domain discontinuities that would occur in "block-based" methods that apply the noise suppression frequency response in the frequency domain. Moreover, the noise suppression filter is designed using the novel approach of determining an auto-correlation function of the noise suppression frequency response. This auto-correlation sequence is then used to generate an all pole filter. The all-pole filter may, in some cases, be less complex to implement that a frequency domain method.

Although the invention has been described in connection with a particular embodiment thereof, it should be appreciated that numerous modifications and adaptations may be made thereto without departing from the scope of the invention as set forth in the claims.

What is claimed is:

1. A method for suppressing noise in an input signal that carries a combination of noise and speech, comprising the steps of:

dividing said input signal into signal blocks;

applying a Discrete Fourier Transform (DFT) to the signal blocks over a number of DFT bins to provide a complex-valued frequency domain representation of each block;

converting the frequency domain representations of the signal blocks to magnitude-only signals; and averaging the magnitude-only signals across different frequency bands to provide an estimate of a short-time perceptual band spectrum of the input signal;

wherein each of the different frequency bands is correlated with an associated plurality of the DFT bins;

determining, at various points in time, whether said input signal is carrying noise only, or a combination of noise and speech, and, when the input signal is carrying noise only, using the corresponding estimated short-time perceptual band spectrum of the input signal to update an estimate of a long term perceptual band spectrum of the noise;

determining a noise suppression frequency response based on said estimate of the long term perceptual band spectrum of the noise and the estimated short-time perceptual band spectrum of the input signal; and providing an all-pole time-domain filter in accordance with said noise suppression frequency response for time-domain shaping of a current block of the input signal to suppress noise therein.

2. The method of claim 1, comprising the further step of:

pre-filtering said input signal prior to applying the DFT to emphasize high frequency components thereof.

3. The method of claim 2, comprising the further step of:

smoothing time variations in the short-time perceptual band spectrum estimate.

4. The method of claim 1, comprising the further step of:

smoothing time variations in the short-time perceptual band spectrum estimate.

5. The method of claim 1, wherein:

the noise suppression frequency response is modeled as being piecewise constant.

6. The method of claim 1, wherein:

widths of at least some of the frequency bands increase progressively with a frequency of the bands.

7. The method of with claim 1, wherein:

the all-pole filter is generated by determining an autocorrelation function of the noise suppression frequency response.

8. The method of claim 1, wherein:

the DFT is applied using a Fast Fourier Transform (FFT).

9. An apparatus for suppressing noise in an input signal that carries a combination of noise and speech, comprising:

a signal preprocessor for dividing said input signal into signal blocks;

a Discrete Fourier transform (DFT) processor for processing said signal blocks over a number of DFT bins to provide a complex-valued frequency domain representation of each block;

means for computing a magnitude of said complex-valued frequency domain representation to provide a frequency domain magnitude spectrum;

an accumulator for accumulating said frequency domain magnitude spectrum into a perceptual-band spectrum comprising frequency bands of unequal width;

wherein values of the frequency domain magnitude spectrum are accumulated from different frequency bands, each of which is correlated with an associated plurality of the DFT bins;

a filter for filtering the perceptual-band spectrum to generate an estimate of a short-time perceptual-band spectrum comprising a current segment of the input signal;

a speech/pause detector for determining whether said input signal is currently noise only or a combination of speech and noise;

a noise spectrum estimator responsive to said speech/pause detector when the input signal is noise only for updating an estimate of a long term perceptual band spectrum of the noise based on the estimated short-time perceptual band spectrum of the input signal;

a spectral gain processor responsive to said noise spectrum estimator for determining a noise suppression frequency response; and a spectral shaping processor comprising an all-pole time-domain filter that is responsive to said spectral gain processor for time-domain shaping of a current block of the input signal to suppress noise therein.

10. The apparatus of claim 9, wherein:

said signal preprocessor pre-filters said input signal to emphasize high frequency components thereof.

11. The apparatus of claim 9, further comprising:

means for smoothing time variations in the short-time perceptual band spectrum estimate.

12. The apparatus of claim 10, further comprising:

means for smoothing time variations in the short-time perceptual band spectrum estimate.

13. The apparatus of claim 9, wherein:

the noise suppression frequency response is modeled as being piecewise constant.

14. The apparatus of claim 9, wherein:

widths of at least some of the frequency bands increase progressively with a frequency of the bands.

15. The apparatus of claim 9, wherein:

the all-pole filter is generated by determining an autocorrelation function of the noise suppression frequency response.

16. The apparatus of claim 9, wherein:

the DFT processor uses a Fast Fourier Transform (FFT).

17. The apparatus of claim 9, further comprising:

means for averaging the frequency domain magnitude spectrum across the different frequency bands.

18. A method for suppressing noise in an input signal that carries a combination of noise and audio information, comprising the steps of:

computing a noise suppression frequency response for said input signal in the frequency domain; and applying said noise suppression frequency response to said input signal using an all-pole time-domain filter to suppress noise in the input signal.

19. The method of claim 18, comprising the further step of:

dividing said input signal into blocks prior to computing the noise suppression frequency response thereof.

20. The method of claim 18, wherein:

the all-pole time-domain filter is generated by determining an autocorrelation function of the noise suppression frequency response.

21. The method of claim 18, wherein:

the all-pole time-domain filter is generated by determining an autocorrelation function of the noise suppression frequency response.

* * * * *